United States Patent
Alben et al.

(10) Patent No.: US 7,633,461 B1
(45) Date of Patent: *Dec. 15, 2009

(54) GRAPHICS SYSTEM INCLUDING A PLURALITY OF HEADS

(75) Inventors: Jonah Matthew Alben, San Jose, CA (US); Krishnaraj S. Rao, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 11/408,548

(22) Filed: Apr. 21, 2006

Related U.S. Application Data

(63) Continuation of application No. 09/877,462, filed on Jun. 7, 2001, now Pat. No. 7,095,386.

(51) Int. Cl.
*G09G 5/00* (2006.01)
(52) U.S. Cl. ............... 345/3.1; 345/1.1; 345/5; 345/506; 345/520; 710/8; 710/14
(58) Field of Classification Search ............ 345/5
See application file for complete search history.

(56) References Cited

U.S. PATENT DOCUMENTS

| | | | |
|---|---|---|---|
| 4,914,625 A * | 4/1990 | Billian | 714/2 |
| 5,138,305 A | 8/1992 | Tomiyasu | |
| 5,414,831 A | 5/1995 | Wilson et al. | |
| 5,488,385 A | 1/1996 | Singhal et al. | |
| 5,500,654 A | 3/1996 | Fujimoto | |
| 5,694,141 A | 12/1997 | Chee | |
| 5,786,825 A | 7/1998 | Cain et al. | |
| 5,841,418 A | 11/1998 | Bril et al. | |
| 6,023,281 A | 2/2000 | Grigor et al. | |
| 6,215,459 B1 | 4/2001 | Reddy et al. | |
| 6,333,750 B1 | 12/2001 | Odryna et al. | |
| 6,424,320 B1 * | 7/2002 | Callway | 345/1.1 |
| 6,628,243 B1 | 9/2003 | Lyons et al. | |
| 7,095,386 B2 * | 8/2006 | Alben et al. | 345/3.1 |
| 2002/0003507 A1 * | 1/2002 | Dodge | 345/3.1 |

OTHER PUBLICATIONS

Non-Final Office Action Dated Apr. 8, 2004; U.S. Appl. No. 09/877,462.
Non-Final Office Action Dated Sep. 15, 2004; U.S. Appl. No. 09/877,462.

(Continued)

*Primary Examiner*—Antonio A Caschera

(57) ABSTRACT

The graphics display system comprises a plurality of heads. Each of the heads includes a VGA controller and each of the heads is adapted for a display. The display system also includes a host coupled to the heads, wherein all the standard VGA settings for each of the heads could be programmed by a single command by the host. A method and system in accordance with the invention includes one VGA controller per head. In a broadcast mode a write transaction from the bus is broadcast to both heads. The output timing registers specific to a non-CRT output are not broadcast. To provide broadcast VGA to a CRT and/or a flat panel, software sets up the timing in extended registers and enables the display devices. The VGA application can provide mode settings via the appropriate write VGA registers and the correct display will be on each head.

7 Claims, 4 Drawing Sheets

OTHER PUBLICATIONS

Final Office Action Dated May 25, 2005; U.S. Appl. No. 09/877,462.
Non-Final Office Action Dated Nov. 29, 2005; U.S. Appl. No. 09/877,462.
Notice of Allowance Dated May 19, 2006; U.S. Appl. No. 09/877,462.

* cited by examiner

GRAPHICS SYSTEM INCLUDING A PLURALITY OF HEADS

CROSS REFERENCE TO RELATED APPLICATION

This patent application claims priority and is a Continuation of commonly-owned patent application Ser. No. 09/877,462, filed on Jun. 7, 2001, now U.S. Pat. No. 7,095,386, entitled "Graphics System Including a Plurality of Heads", by Jonah Matthew Alben and Krishnaraj S. Rao, and assigned to the assignee of the present invention, the disclosure of which is incorporated herein by reference.

FIELD OF THE INVENTION

The present invention relates generally to a graphics display system and more particularly to a graphics display system that includes a broadcast mode VGA feature.

BACKGROUND OF THE INVENTION

Typically in a graphics display system, it is desirable to be able to display the images to different types of displays. Conventional graphic display systems do allow displaying to a different display, but only if the timing is exactly the same for the displays. For example, in a conventional graphics display system, if a flat panel provides a 1600×1200×60 Hz scale image, a cathode ray tube (CRT) will display the same scale image. Typically this is accomplished utilizing a single head design which works for one display pipeline. To describe this single head design in more detail, refer now to FIG. 1.

FIG. 1 is a block diagram of a conventional graphics display system 10. The conventional graphics display system 10 includes a memory 12 which is in communication with a frame buffer interface 14. The system 10 includes a host 16 which receives programming signals from an AGP (or PCI) bus 18 which controls both a VGA controller 20 and a CRT controller 22. The VGA controller 20 retrieves information from and provides information to the frame buffer interface and communicates with the CRT controller 22 via register signals. The CRT controller 22 is coupled to pipeline 24. The VGA controller 20, CRT controller 22 and pipeline 24 comprise a single display head 40. In this single head system 10 the CRT controller 22 then provides data through a pipeline 24 to a plurality of displays, for example a CRT 26, flat panel (FP) display 28 or a television 30. Each of the displays can be serially switched onto the single head graphics system 10 or all of the displays can simultaneously receive the signals from the graphics system 10.

A problem with the single head system is that, unless all of the displays are compatible, then there are timing issues associated therewith. Accordingly, the pipeline would require complex circuitry to ensure that these timing issues are addressed, which would significantly add to the cost of the graphics display system. The conventional graphics display system 10 works well with traditional panels (800×600, 1024×768) which use standard VESA timings. However, the mobile industry is moving aggressively towards large flat panels (1600×1200, 2048×1536) with non-standard timings.

In addition, the higher resolutions are not supported by most CRTs. If multiple displays are to be utilized simultaneously they must be coupled tightly together. This is oftentimes undesirable because the costs associated with circuitry to allow for compatibility is prohibitive.

Accordingly, what is needed is a system that overcomes the above-identified problems. The present invention addresses such a need.

SUMMARY OF THE INVENTION

A graphics display system is disclosed. The display system comprises a plurality of heads. Each of the plurality of heads includes a VGA controller. Each of the heads is adapted for a display. The graphics display system also includes a host coupled to the plurality of heads, wherein all the standard VGA settings for each of the plurality of the heads are programmed by a single command by the host.

A system and method for providing a broadcast mode VGA feature is disclosed. A method and system in accordance with the present invention includes one VGA controller per head. In so doing, in a broadcast mode a write transaction from the bus is broadcast or written to both heads. Also, in a broadcast mode, the VGA data read from the bus always comes from one of the heads. The output timing registers specific to a non-CRT output are not broadcast. To provide broadcast VGA to a CRT and/or a flat panel, the software sets up the timing in extended registers and enables the CRT. The VGA application can then provide mode settings via the appropriate write to VGA registers and the correct display will be on each head.

DETAILED DESCRIPTION

The present invention relates generally to a graphics display system and more particularly to a graphics display system that includes a plurality of heads. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
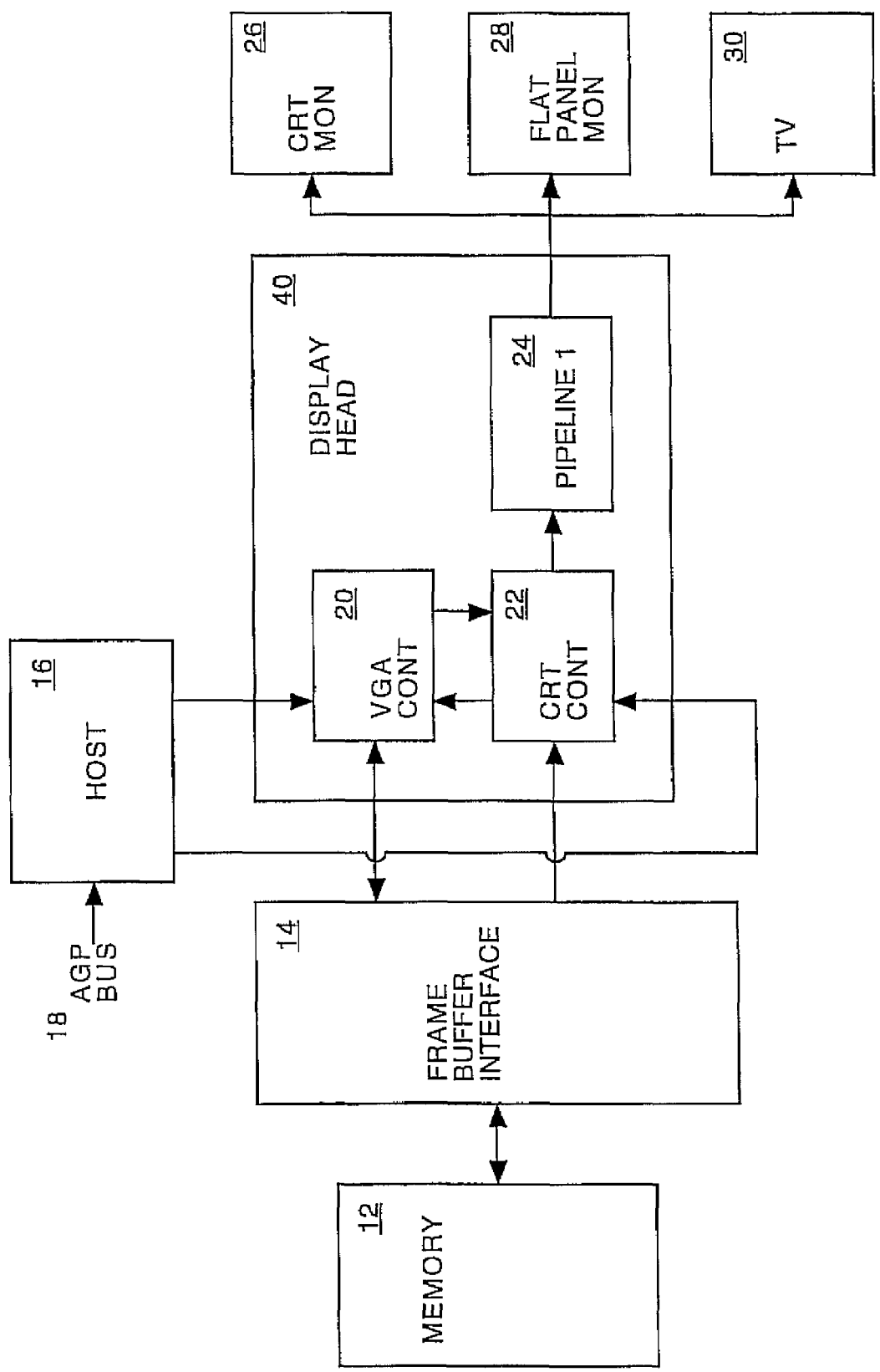
FIG. 1 is a block diagram of a conventional graphics display system.
Figure 2:
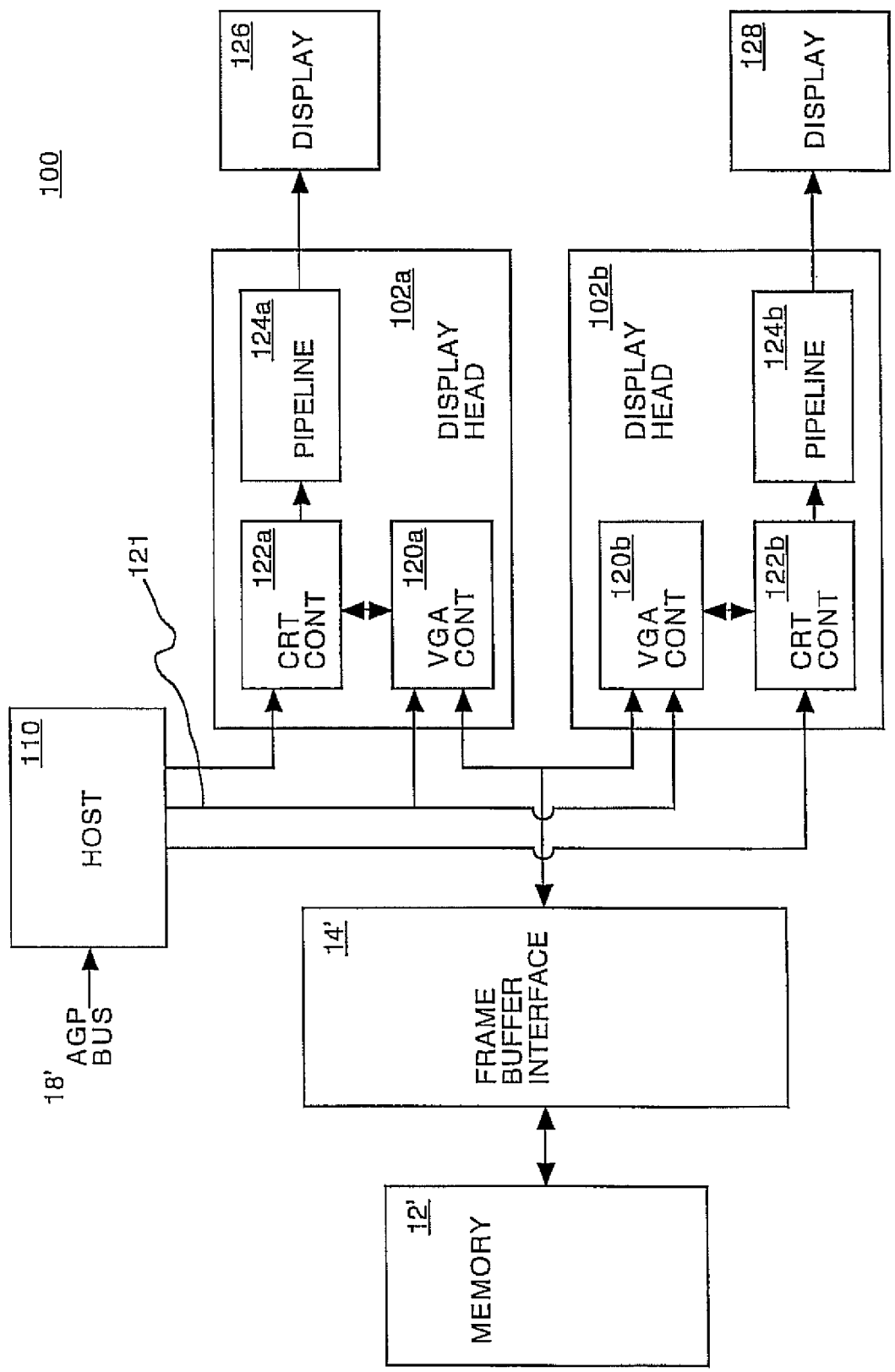
FIG. 2 is a block diagram of a graphics display system in accordance with the present invention.

FIG. 2 is a block diagram of a graphics display system 100 in accordance with the present invention. The graphics display system 100 includes a memory 12' which is in communication with a frame buffer interface 14'. The graphics display system 100 includes first and second display heads 102a and 102b which can be individually programmed via the host 110. Each of the heads 102a and 102b are in communication with a frame buffer interface 14'. Although two heads 102a and 102b are shown in accordance with the preferred embodiment, one of ordinary skill in the art readily recognizes that there can be any number of heads within the graphics system and that would be within the spirit and scope of the present invention.

Head 102a includes a CRT controller 122a, a VGA controller 120a, and a pipeline 124a. The pipeline 124a is coupled to display 126. Head 102b includes a CRT controller 122b, a VGA controller 120b, and a pipeline 124b. The pipeline 124b is coupled to display 128.

Each head 102a and 102b is also in communication with the host 110 which receives programming signals from an AGP (or PCI) bus 18'. The host 110 communicates with both of the CRT controllers 122a and 122b. The VGA controllers 120a and 120b retrieve information from and provide information to the frame buffer interface and communicate with its respective CRT controller, 122a or 122b, via register signals.

Each of the CRT controllers 122a and 122b then provides data through its respective pipeline 124a or 124b to a plurality of displays, for example, flat panel displays, TV and a CRT. The host 110, in a custom mode, provides programming signals to the CRT controllers 122a and 122b to provide the custom settings for the particular display (i.e., flat panel, television and/or CRT).

This allows each of those heads, 102a and 102b, to operate independently. The host 110 in a broadcast mode also provides a standard VGA programming signal 121, which sets the VGA register settings in both VGA controllers 120a and 120b. In so doing, the standard VGA programming signal 121 allows each of the heads 102a and 102b to be programmed simultaneously.

Figure 3:
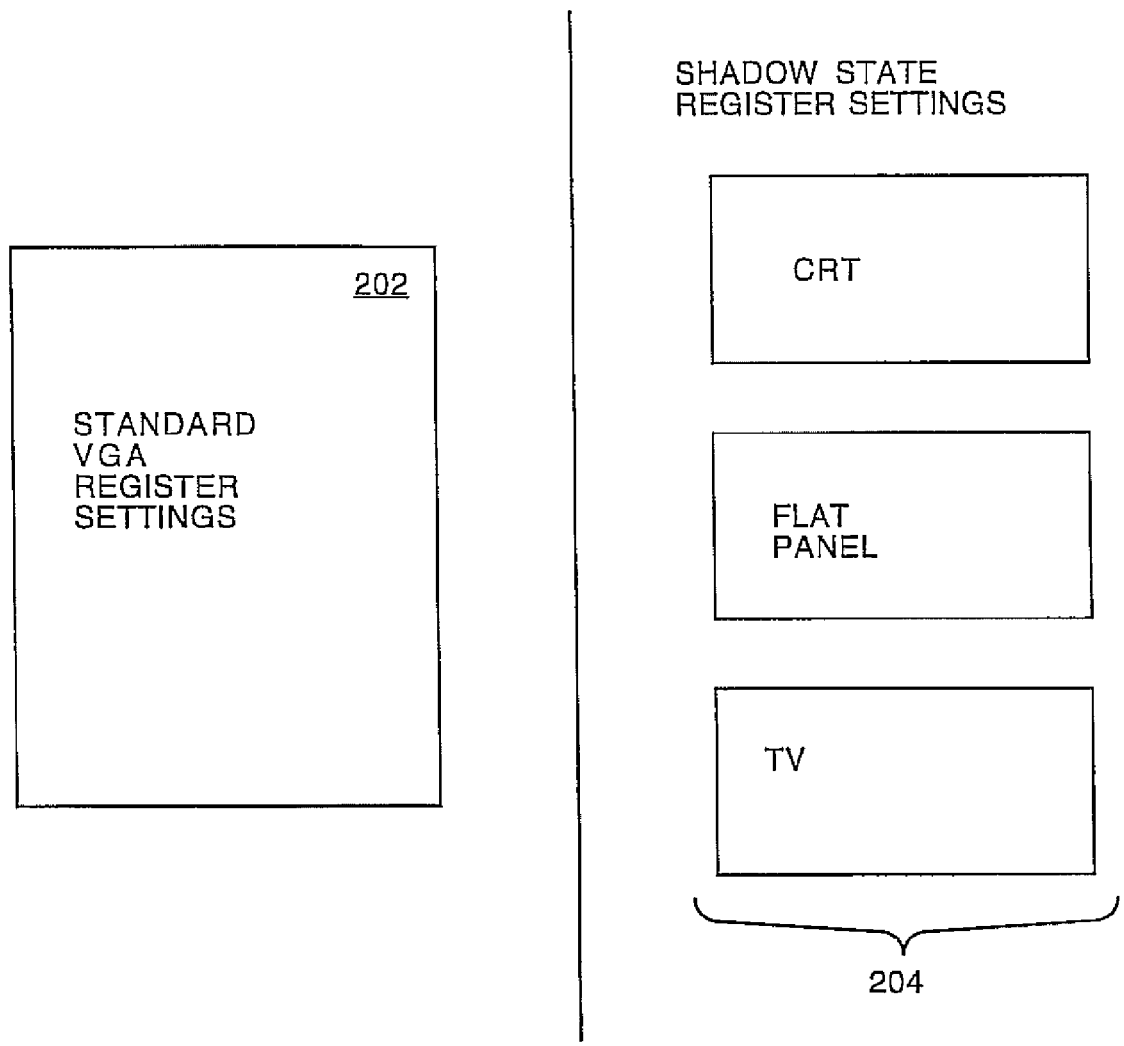
FIG. 3 is a diagram that illustrates areas for VGA register settings and shadow state register settings for the custom settings for the specific display.

FIG. 3 is a diagram that illustrates areas for VGA register settings 202 and shadow state register settings 204 for the custom settings for the specific display. In the shadow state register settings 204, which the VGA controller has no access to, the custom timing information for the particular display (i.e., a CRT, FP or TV) is stored. The host also provides the standard VGA settings for all of the active heads.

In a preferred embodiment, in broadcast VGA mode, the VGA write transactions from the bus are broadcast, i.e., written to both heads, 102a and 102b, substantially simultaneously. Furthermore, in broadcast mode, the VGA data that are read from the bus always comes from head 102a (since both of the heads should have the same read data). Accordingly, the broadcast VGA mode allows a single screen surface to be displayed to two totally arbitrary displays with independent timing (CRT at 640×480×85 Hz, FP at 1600×200×60 Hz scaled, etc.).

To describe the present invention in more detail refer now to the following discussion in conjunction with the accompanying figures.

Figure 4:
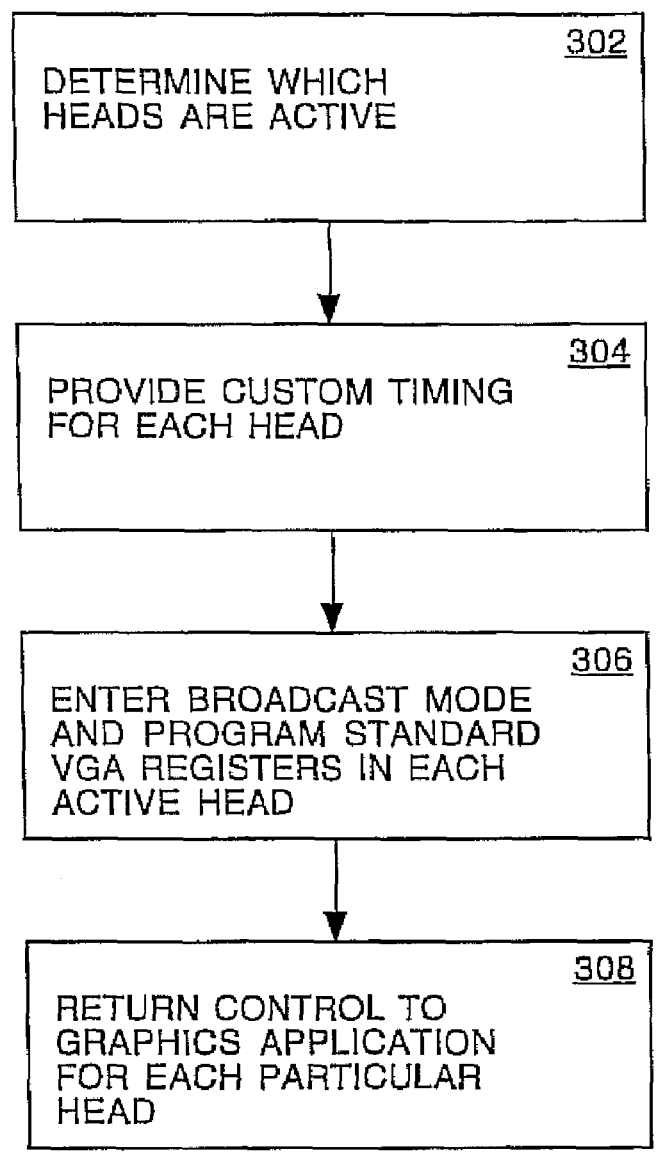
FIG. 4 is a flow chart illustrating a process for programming both VGA controllers simultaneously within the graphics display system in accordance with the present invention.

FIG. 4 is a flow chart illustrating a process for programming both VGA controllers simultaneously within the graphics display system in accordance with the present invention. Accordingly, in a system and method in accordance with the present invention, first the graphics application determines which heads within the display system are to be active, via step 302. Then, the custom timing for each head is provided, via step 304. In this mode, those settings which relate to the type of device (i.e., flat panel television, CRT, etc.) are set. Next, broadcast mode is entered and the VGA registers for all of the active heads are programmed through a single command, via step 306. Finally, control of the display system is returned to the graphics application for each of the particular heads, via step 308. Accordingly, a single command can be utilized for simultaneously programming or switching display modes on each of heads in a multiple head graphics display system.

A system and method for providing a broadcast mode VGA feature is disclosed. A method and system in accordance with the present invention includes one VGA controller per head. In so doing, in a broadcast mode a write transaction from the bus is broadcast or written to both heads. Also, in a broadcast mode, the VGA read data from the bus always comes from one of the heads. The output timing registers specific to a non-CRT output are not broadcast. To provide broadcast VGA to a CRT and/or a flat panel, software sets up the timing in extended registers and enables the CRT. The VGA application can then provide mode settings via the appropriate write VGA registers and the correct display will be on each head.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method comprising:
  receiving programming signals in an electronic system;
  providing custom timing in said electronic system, specific to a non-CRT output, in a first mode, depending upon the particular display attached to a particular display head for each of a plurality of display heads; and
  providing a single command in said electronic system over a single bus, in a second mode, to registers in VGA controllers in all the plurality of display heads to program all of the standard VGA settings, wherein said second mode comprises a broadcast mode.

2. The method of claim 1 further comprising:
  providing control of the plurality of display heads to a graphics application.

3. The method of claim 1, wherein said providing custom timing in said electronic system comprises:
  providing custom timing in said first mode, wherein said first mode comprises a custom mode.

4. The method of claim 3, further comprising:
  programming a shadow state register of a given display head with a custom specific setting for a corresponding display in said custom mode.

5. The method of claim 1, further comprising:
  displaying a single screen surface on two different displays, each having different timing.

6. The method of claim 1, further comprising:
  reading data from a VGA controller in said broadcast mode.

7. The method of claim 1, further comprising:
  substantially simultaneously programming the plurality of display heads in said second mode.

* * * * *